(12) United States Patent
Ackley

(10) Patent No.: US 11,727,232 B2
(45) Date of Patent: Aug. 15, 2023

(54) ENHANCED MATRIX SYMBOL ERROR CORRECTION METHOD

(71) Applicant: Hand Held Products, Inc., Charlotte, NC (US)

(72) Inventor: H. Sprague Ackley, Seattle, WA (US)

(73) Assignee: HAND HELD PRODUCTS, INC., Charlotte, NC (US)

( * ) Notice: Subject to any disclaimer, the term of this patent is extended or adjusted under 35 U.S.C. 154(b) by 0 days.

(21) Appl. No.: 17/819,057

(22) Filed: Aug. 11, 2022

(65) Prior Publication Data

US 2022/0383016 A1 Dec. 1, 2022

Related U.S. Application Data

(63) Continuation of application No. 17/077,658, filed on Oct. 22, 2020, now Pat. No. 11,449,700, which is a
(Continued)

(51) Int. Cl.
*G06K 7/14* (2006.01)
*G06F 11/10* (2006.01)

(52) U.S. Cl.
CPC ............ *G06K 7/1473* (2013.01); *G06F 11/10* (2013.01); *G06K 7/14* (2013.01); *G06K 7/1417* (2013.01)

(58) Field of Classification Search
CPC ............... G06K 7/1473; G06K 7/1417; G06K 19/06037; G06K 19/06046;
(Continued)

(56) References Cited

U.S. PATENT DOCUMENTS 5,553,084 A 9/1996 Ackley et al.
6,330,972 B1 12/2001 Wiklof et al.
(Continued)

FOREIGN PATENT DOCUMENTS

CN 1402191 A 3/2003
CN 103593695 A 2/2014
(Continued)

OTHER PUBLICATIONS

US 8,548,242 B1, 10/2013, Longacre (withdrawn)
(Continued)

*Primary Examiner* — Kyle Vallecillo
(74) *Attorney, Agent, or Firm* — Alston & Bird LLP

(57) ABSTRACT

A system and method for error correction for machine-readable symbols having data codewords, and having error correction (EC) codewords derived from the data codewords and redundantly indicating the location and data contents of the data codewords. The symbols use Reed-Solomon (RS) error correction to retrieve damaged codewords. RS error correction normally requires two EC codewords to identify both the location and data contents of a data codeword. The present system and method perform optical contrast analysis on the codewords, identifying those codewords with the lowest contrast levels. Codewords with the lowest contrast levels are flagged as optically ambiguous, thereby marking, in the EC equations, the locations of the codewords most like to be in error. As a result, only a single EC codeword is required to retrieve the data for a flagged data codeword.

20 Claims, 8 Drawing Sheets

Related U.S. Application Data continuation of application No. 16/268,721, filed on Feb. 6, 2019, now Pat. No. 10,846,498, which is a continuation of application No. 15/006,561, filed on Jan. 26, 2016, now Pat. No. 10,235,547.

(58) Field of Classification Search
CPC ....... G06K 19/06075; G06K 19/06056; G06K 7/10722; G06K 7/1434; G06F 11/10
See application file for complete search history.

(56) References Cited

U.S. PATENT DOCUMENTS

| | | |
|---|---|---|
| 6,832,725 B2 | 12/2004 | Gardiner et al. |
| 7,128,266 B2 | 10/2006 | Zhu et al. |
| 7,159,783 B2 | 1/2007 | Walczyk et al. |
| 7,413,127 B2 | 8/2008 | Ehrhart et al. |
| 7,726,575 B2 | 6/2010 | Wang et al. |
| 8,177,108 B1 | 5/2012 | Kincaid et al. |
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Van et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein, Jr. |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre, Jr. |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,736,909 B2 | 5/2014 | Sato et al. |
| 8,740,082 B2 | 6/2014 | Wilz, Sr. |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue et al. |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein, Jr. |
| 8,880,426 B2 | 11/2014 | Smith |
| 8,881,983 B2 | 11/2014 | Havens et al. |
| 8,881,987 B2 | 11/2014 | Wang |

(56) References Cited

U.S. PATENT DOCUMENTS

| | | |
|---|---|---|
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | El et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber et al. |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,224,022 B2 | 12/2015 | Ackley et al. |
| 9,224,027 B2 | 12/2015 | Van et al. |
| D747,321 S | 1/2016 | London et al. |
| 9,230,140 B1 | 1/2016 | Ackley |
| 9,250,712 B1 | 2/2016 | Todeschini |
| 9,258,033 B2 | 2/2016 | Showering |
| 9,261,398 B2 | 2/2016 | Amundsen et al. |
| 9,262,633 B1 | 2/2016 | Todeschini et al. |
| 9,262,664 B2 | 2/2016 | Soule et al. |
| 9,274,806 B2 | 3/2016 | Barten |
| 9,282,501 B2 | 3/2016 | Wang et al. |
| 9,292,969 B2 | 3/2016 | Laffargue et al. |
| 9,298,667 B2 | 3/2016 | Caballero |
| 9,310,609 B2 | 4/2016 | Rueblinger et al. |
| 9,319,548 B2 | 4/2016 | Showering et al. |
| D757,009 S | 5/2016 | Oberpriller et al. |
| 9,342,724 B2 | 5/2016 | McCloskey et al. |
| 9,342,827 B2 | 5/2016 | Smith |
| 9,355,294 B2 | 5/2016 | Smith et al. |
| 9,367,722 B2 | 6/2016 | Xian et al. |
| 9,375,945 B1 | 6/2016 | Bowles |
| D760,719 S | 7/2016 | Zhou et al. |
| 9,390,596 B1 | 7/2016 | Todeschini |
| 9,396,375 B2 | 7/2016 | Qu et al. |
| 9,398,008 B2 | 7/2016 | Todeschini et al. |
| D762,604 S | 8/2016 | Fitch et al. |
| D762,647 S | 8/2016 | Fitch et al. |
| 9,405,011 B2 | 8/2016 | Showering |
| 9,407,840 B2 | 8/2016 | Wang |
| 9,412,242 B2 | 8/2016 | Van et al. |
| 9,418,252 B2 | 8/2016 | Nahill et al. |
| D766,244 S | 9/2016 | Zhou et al. |
| 9,443,123 B2 | 9/2016 | Hejl |
| 9,443,222 B2 | 9/2016 | Singel et al. |
| 9,448,610 B2 | 9/2016 | Davis et al. |
| 9,478,113 B2 | 10/2016 | Xie et al. |
| D771,631 S | 11/2016 | Fitch et al. |
| 9,507,974 B1 | 11/2016 | Todeschini |
| D777,166 S | 1/2017 | Bidwell et al. |
| 9,582,696 B2 | 2/2017 | Barber et al. |
| D783,601 S | 4/2017 | Schulte et al. |
| 9,616,749 B2 | 4/2017 | Chamberlin |
| 9,618,993 B2 | 4/2017 | Murawski et al. |
| D785,617 S | 5/2017 | Bidwell et al. |
| D785,636 S | 5/2017 | Oberpriller et al. |
| D790,505 S | 6/2017 | Vargo et al. |
| D790,546 S | 6/2017 | Zhou et al. |
| D790,553 S | 6/2017 | Fitch et al. |
| 9,715,614 B2 | 7/2017 | Todeschini et al. |
| 9,734,493 B2 | 8/2017 | Gomez et al. |
| 9,786,101 B2 | 10/2017 | Ackley |
| 9,857,167 B2 | 1/2018 | Jovanovski et al. |
| 9,891,612 B2 | 2/2018 | Charpentier et al. |
| 9,892,876 B2 | 2/2018 | Bandringa |
| 9,954,871 B2 | 4/2018 | Hussey et al. |
| 9,978,088 B2 | 5/2018 | Pape |
| 10,007,112 B2 | 6/2018 | Fitch et al. |
| 10,019,334 B2 | 7/2018 | Caballero et al. |
| 10,021,043 B2 | 7/2018 | Sevier |
| 10,038,716 B2 | 7/2018 | Todeschini et al. |
| 10,066,982 B2 | 9/2018 | Ackley et al. |
| 10,235,547 B2 | 3/2019 | Ackley |
| 10,327,158 B2 | 6/2019 | Wang et al. |
| 10,360,728 B2 | 7/2019 | Venkatesha et al. |
| 10,401,436 B2 | 9/2019 | Young et al. |
| 10,410,029 B2 | 9/2019 | Powilleit |
| 10,846,498 B2 | 11/2020 | Ackley |
| 2002/0041712 A1* | 4/2002 | Roustaei .......... G06K 7/14 382/199 |
| 2003/0009725 A1 | 1/2003 | Reichenbach |
| 2004/0182930 A1 | 9/2004 | Nojiri |
| 2004/0190085 A1 | 9/2004 | Silverbrook et al. |
| 2004/0190092 A1 | 9/2004 | Silverbrook et al. |
| 2005/0103868 A1* | 5/2005 | Zhu ............ G06K 7/10732 235/462.46 |
| 2005/0199721 A1 | 9/2005 | Chang et al. |
| 2007/0051813 A1 | 3/2007 | Kiuchi et al. |
| 2007/0063048 A1 | 3/2007 | Havens et al. |
| 2008/0185432 A1 | 8/2008 | Caballero et al. |
| 2008/0298688 A1 | 12/2008 | Cheong et al. |
| 2009/0121024 A1 | 5/2009 | Umeda |

(56) References Cited

U.S. PATENT DOCUMENTS

| | | |
|---|---|---|
| 2009/0134221 A1 | 5/2009 | Zhu et al. |
| 2009/0212111 A1 | 8/2009 | Krichi et al. |
| 2009/0230193 A1 | 9/2009 | Al-Hussein et al. |
| 2009/0242649 A1 | 10/2009 | Mizukoshi et al. |
| 2010/0014784 A1 | 1/2010 | Silverbrook et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0265880 A1 | 10/2010 | Rautiola et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168511 A1 | 7/2012 | Kotlarsky et al. |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2012/0228382 A1 | 9/2012 | Havens et al. |
| 2012/0248188 A1 | 10/2012 | Kearney |
| 2013/0033617 A1 | 2/2013 | Schueler et al. |
| 2013/0043312 A1 | 2/2013 | Van Horn |
| 2013/0075168 A1 | 3/2013 | Amundsen et al. |
| 2013/0082104 A1 | 4/2013 | Kearney et al. |
| 2013/0175341 A1 | 7/2013 | Kearney et al. |
| 2013/0175343 A1 | 7/2013 | Good |
| 2013/0182002 A1 | 7/2013 | Macciola et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0301870 A1 | 11/2013 | Mow et al. |
| 2013/0306728 A1 | 11/2013 | Thuries et al. |
| 2013/0306731 A1 | 11/2013 | Pedrao |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein, Jr. |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0097249 A1 | 4/2014 | Gomez et al. |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein, Jr. |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Long et al. |
| 2014/0121445 A1 | 5/2014 | Fontenot et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0144996 A1 | 5/2014 | Friedman et al. |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0267609 A1 | 9/2014 | Laffargue |
| 2014/0270196 A1 | 9/2014 | Braho et al. |
| 2014/0270229 A1 | 9/2014 | Braho |
| 2014/0278387 A1 | 9/2014 | Digregorio |
| 2014/0278391 A1 | 9/2014 | Braho et al. |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |

(56) References Cited

U.S. PATENT DOCUMENTS

| | | |
|---|---|---|
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0039878 A1 | 2/2015 | Barten |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0060544 A1 | 3/2015 | Feng et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071818 A1 | 3/2015 | Scheuren et al. |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chen et al. |
| 2015/0169929 A1 | 6/2015 | Williams et al. |
| 2015/0178523 A1 | 6/2015 | Gelay et al. |
| 2015/0178534 A1 | 6/2015 | Jovanovski et al. |
| 2015/0178535 A1 | 6/2015 | Bremer et al. |
| 2015/0178536 A1 | 6/2015 | Hennick et al. |
| 2015/0178537 A1 | 6/2015 | El et al. |
| 2015/0181093 A1 | 6/2015 | Zhu et al. |
| 2015/0181109 A1 | 6/2015 | Gillet et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0221077 A1 | 8/2015 | Kawabata et al. |
| 2015/0254485 A1 | 9/2015 | Feng et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0109219 A1 | 4/2016 | Ackley et al. |
| 2016/0109220 A1 | 4/2016 | Laffargue et al. |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0125873 A1 | 5/2016 | Braho et al. |
| 2016/0133253 A1 | 5/2016 | Braho et al. |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0189087 A1 | 6/2016 | Morton et al. |
| 2016/0227912 A1 | 8/2016 | Oberpriller et al. |
| 2016/0232891 A1 | 8/2016 | Pecorari |
| 2016/0267369 A1 | 9/2016 | Picard et al. |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Wilz et al. |
| 2016/0314294 A1 | 10/2016 | Kubler et al. |
| 2016/0377414 A1 | 12/2016 | Thuries et al. |

FOREIGN PATENT DOCUMENTS

| | | |
|---|---|---|
| CN | 103903225 A | 7/2014 |
| CN | 104715221 A | 6/2015 |
| JP | 10-111904 A | 4/1998 |
| JP | H10-171912 A | 6/1998 |
| JP | 11-111904 A | 4/1999 |
| JP | 2001-167222 A | 6/2001 |
| JP | 2013-148981 A | 8/2013 |
| KR | 10-2011-0002833 A | 1/2011 |
| WO | 2013/163789 A1 | 11/2013 |
| WO | 2013/173985 A1 | 11/2013 |
| WO | 2014/019130 A1 | 2/2014 |
| WO | 2014/110495 A1 | 7/2014 |

OTHER PUBLICATIONS

US 8,616,454 B2, 12/2013, Havens et al. (withdrawn)
U.S. Appl. No. 17/077,658, filed Oct. 22, 2020, U.S. Pat. No. 11,449,700, Issued.
U.S. Appl. No. 16/268,721, filed Feb. 6, 2019, U.S. Pat. No. 10,846,498, Issued.
U.S. Appl. No. 15/066,561, filed Jan. 26, 2016, U.S. Pat. No. 10,235,547, Issued.
JP Decision to Grant dated Mar. 16, 2023 for JP Application No. 2021053085, 3 page(s).
Advisory Action (PTOL-303) dated Feb. 21, 2018 for U.S. Appl. No. 15/006,561.
Advisory Action (PTOL-303) dated Sep. 24, 2018 for U.S. Appl. No. 15/006,561.
Annex to the communication dated Feb. 28, 2019 for EP Application No. 17151685.
CN Notice of Allowance dated Jan. 12, 2022 for CN Application No. 201710140373, 2 pages.
CN Office Action dated Aug. 4, 2021 for CN Application No. 201710140373.
CN Office Action dated Aug. 4, 2021 for CN Application No. 201710140373, 6 pages.
CN Office Action dated Jan. 21, 2021 for CN Application No. 201710140373.
CN Office Action, including Search Report, dated Jan. 21, 2021 for CN Application No. 201710140373, 11 pages.
Communication about intention to grant a European patent dated Feb. 23, 2021 for EP Application No. 17151685, 5 pages.
Communication from the Examining Division dated Feb. 28, 2019 for EP Application No. 17151685.
Decision to grant a European patent dated Jul. 1, 2021 for EP Application No. 17151685.
Decision to grant a European patent received for European Application No. 17151685.9, dated Jul. 1, 2021, 2 pages.
English translation of CN Notice of Allowance dated Jan. 12, 2022 for CN Application No. 201710140373, 3 pages.
English Translation of CN Office Action dated Aug. 4, 2021 for CN Application No. 201710140373, 9 pages.
English Translation of CN Office Action dated Jan. 21, 2021 for CN Application No. 201710140373.
English Translation of JP Decision to Grant dated Feb. 22, 2021 for JP Application No. 2017007324, 2 pages.

(56) References Cited

OTHER PUBLICATIONS

English Translation of JP Office Action dated Apr. 21, 2022 for JP Application No. 2021053085.
English Translation of JP Office Action dated Feb. 22, 2021 for JP Application No. 2017007324.
English Translation of JP Search report dated Apr. 21, 2022 for JP Application No. 2021053085, 21 pages.
European search opinion dated Jun. 16, 2017 for EP Application No. 17151685.
European Search Report and Search Opinion Received for EP Application No. 17151685.9, dated Jun. 16, 2017, 7 pages.
European search report dated Jun. 16, 2017 for EP Application No. 17151685.
Examination Report in related European Application No. 17151685.9 dated Feb. 28, 2019, pp. 1-4.
Extended European search report and written opinion dated Nov. 22, 2021 for EP Application No. 21186794, 6 pages.
Extended Search Report in related European Application No. 17151685.9 dated Jun. 16, 2017, pp. 1-7.
Final Rejection dated Dec. 4, 2017 for U.S. Appl. No. 15/006,561.
Final Rejection dated Jul. 11, 2018 for U.S. Appl. No. 15/006,561.
Furumoto, K., et al., Recognition Accuracy Improvement of QR Code by Using GMD Decoding, IEICE Technical Report IT2014-27(Jul. 2014), Jul. 10, 2014, vol. 114, No. 138, pp. 89-94, The Institute of Electronics Information and Communication Engineers, Japan. (Abstract Only).
Hahn, H.I., et al., "Implementation of Algorithm to Decode Two-Dimensional Barcode PDF-417", 6th International Conference on Signal Processing, 2002, Conference Location: Beijing, China, Date of Conference: Aug. 26-30, 2002, pp. 1791-1794. (Year:2002).
Intention to grant (signatures) dated Feb. 23, 2021 for EP Application No. 17151685.
JP Decision to Grant dated Feb. 22, 2021 for JP Application No. 2017007324.
JP Decision to Grant dated Feb. 22, 2021 for JP Application No. 2017007324, 3 pages.
JP Office Action dated Jun. 1, 2022 for JP Application No. 2021053085, 6 pages.
JP Office Action dated Nov. 17, 2020 for JP Application No. 2017007324.
JP Search report dated Apr. 21, 2022 for JP Application No. 2021053085, 19 pages.
JP Search report dated Nov. 11, 2020 for JP Application No. 2017007324.
Non-Final Rejection dated Apr. 9, 2020 for U.S. Appl. No. 16/268,721.
Non-Final Rejection dated May 18, 2017 for U.S. Appl. No. 15/006,561.
Notice of Allowance and Fees Due (PTOL-85) dated Jul. 23, 2020 for U.S. Appl. No. 16/268,721.
Notice of Allowance and Fees Due (PTOL-85) dated Nov. 1, 2018 for U.S. Appl. No. 15/006,561.
Notice of Allowance received for U.S. Appl. No. 17/077,658, dated Jul. 20, 2022, 2 pages.
Notice of Allowance received for U.S. Appl. No. 17/077,658, dated Jun. 13, 2022, 18 pages.
Notice of Allowance received for U.S. Appl. No. 17/077,658, dated May 11, 2022, 21 pages.
Office Action received for European Patent Application No. 17151685.9, dated Feb. 28, 2019, 4 pages.
U.S. Appl. No. 13/367,978, filed Feb. 7, 2012, (Feng et al.); now abandoned.
U.S. Appl. No. 14/277,337 for Multipurpose Optical Reader, filed May 14, 2014 (Jovanovski et al.); 59 pages; now abandoned.
U.S. Patent Application for Indicia-reader Having Unitary Construction Scanner, filed Jan. 8, 2014 (Colavito et al.), U.S. Appl. No. 14/150,393.
U.S. Patent Application for System and Method for Detecting Barcode Printing Errors filed Jan. 14, 2015 (Ackley), U.S. Appl. No. 14/596,757.
U.S. Appl. No. 13/367,978 for a Laser Scanning Module Employing an Elastomeric U-Hinge Based Laser Scanning Assembly, filed Feb. 7, 2012 (Feng et al.), now abandoned.
U.S. Appl. No. 14/283,282 for Terminal Having Illumination and Focus Control filed May 21, 2014 (Liu et al.); 31 pages; now abandoned.
U.S. Appl. No. 14/446,391 for Multifunction Point of Sale Apparatus With Optical Signature Capture filed Jul. 30, 2014 (Good et al.); 37 pages; now abandoned.
U.S. Appl. No. 14/676,109 for Indicia Reader filed Apr. 1, 2015 (Huck); now abandoned.

\* cited by examiner

700 ↙           702     702

| CW | RSmin | RBmax | ESgap | Sgap% | EBgap | Bgap% | RANK |
|---|---|---|---|---|---|---|---|
| 1 | D0 | 58 | 5B | 85 | 1D | 47 | |
| 2 | B8 | 47 | 43 | 63 | 2E | 74 | |
| 3 | B8 | 40 | 43 | 63 | 35 | 85 | |
| 4 | AF | 47 | 3A | 54 | 2E | 74 | |
| 5 | A0 | 3F | 2B | 40 | 36 | 87 | |
| 6 | DF | 47 | 6A | 99 | 2E | 74 | |
| 7 | D0 | 40 | 5B | 85 | 35 | 85 | |
| 8 | D8 | 3F | 63 | 93 | 36 | 87 | |
| 9 | DF | 3F | 6A | 99 | 36 | 87 | |
| 10 | A8 | 3F | 33 | 48 | 36 | 87 | |
| 11! | 7F | 3F | 0A | 09 | 36 | 87 | 4 |
| 12! | 88 | 3F | 13 | 18 | 36 | 87 | 7 |
| 13 | AF | 40 | 3A | 54 | 35 | 85 | |
| 14 | C0 | 3F | 4B | 70 | 36 | 87 | |
| 15 | BF | 3F | 4A | 69 | 36 | 87 | |
| 16 | DF | 3F | 6A | 99 | 36 | 87 | |
| 17 | C0 | 3F | 4B | 70 | 36 | 87 | |
| 18! | 77 | 38 | 02 | 02 | 3D | 98 | 2 |
| 19! | 77 | 3F | 02 | 02 | 36 | 87 | 1 |
| 20! | 9F | 40 | 2A | 39 | 35 | 85 | 12 |
| 21 | D7 | 3F | 62 | 92 | 36 | 87 | |
| 22 | E0 | 67 | 6B | 100 | 0E | 23 | 9 |
| 23 | C8 | 40 | 53 | 78 | 35 | 85 | |
| 24! | 80 | 3F | 0B | 10 | 36 | 87 | 6 |
| 25! | 88 | 3F | 13 | 18 | 36 | 87 | 8 |
| 26! | 90 | 38 | 1B | 25 | 3D | 98 | 11 |
| 27! | A7 | 3F | 32 | 47 | 36 | 87 | XXX |
| 28 | DF | 40 | 6A | 99 | 35 | 85 | |
| 29 | DF | 40 | 6A | 99 | 35 | 85 | |
| 30 | D0 | 3F | 5B | 85 | 36 | 87 | |
| 31 | CF | 38 | 5A | 84 | 3D | 98 | |
| 32 | BF | 40 | 4A | 69 | 35 | 85 | |
| 33 | AF | 38 | 3A | 54 | 3D | 98 | |
| 34 | 7F | 3F | 0A | 09 | 36 | 87 | 5 |
| 35! | 78 | 3F | 03 | 03 | 36 | 87 | 3 |
| 36! | 8F | 3F | 1A | 24 | 36 | 87 | 10 |
| 37 | CF | 3F | 5A | 84 | 36 | 87 | |
| 38 | D7 | 37 | 62 | 92 | 3E | 100 | |
| 39 | D0 | 38 | 5B | 85 | 3D | 98 | |
| 40 | C8 | 3F | 53 | 78 | 36 | 87 | |

FIG. 7

ACTUAL CODEWORDS IN ERROR AS INTERPRETED BY A SCANNER IN THE FIELD.

SAME SYMBOL, CODEWORDS-IN-ERROR AS ANALYZED BY ALGORITHM.

ENHANCED MATRIX SYMBOL ERROR CORRECTION METHOD

CROSS-REFERENCE TO RELATED APPLICATIONS

The present application is a continuation of U.S. Non-Provisional application Ser. No. 17/077,658, filed Oct. 22, 2022 (and published Mar. 11, 2021 as U.S. Patent Application Publication No. 2021/0073501), which is a continuation of U.S. Non-Provisional application Ser. No. 16/268,721, filed Feb. 6, 2019 (and published Jun. 13, 2019 as U.S. Patent Application Publication No. 2019/0180068), which is a continuation of and claims the benefit of U.S. patent application Ser. No. 15/006,561 for Enhanced Matrix Symbol Error Correction Method filed Jan. 26, 2016 (and published Jul. 27, 2017 as US. Patent Application Publication No. 2017/0213064), and subsequently issued as U.S. Pat. No. 10,235,547. Each of the foregoing patent applications, patent, and patent publications is hereby incorporated by reference in its entirety.

FIELD OF THE INVENTION

The present invention relates to a method and apparatus for decoding machine-readable symbols, and more particularly, to a method and apparatus for decoding symbols requiring error correction.

BACKGROUND

Machine-readable symbols provide a means for encoding information in a compact printed form (or embossed form) which can be scanned and then interpreted by an optical-based symbol detector. Such machine readable symbols are often attached to (or impressed upon) product packaging, food products, general consumer items, machine parts, equipment, and other manufactured items for purposes of machine-based identification and tracking.

One exemplary type of machine-readable symbol is a bar code that employs a series of bars and white spaces vertically oriented along a single row. Groups of bars and spaces correspond to a codeword. The codeword is associated with an alpha-numeric symbol, one or more numeric digits, or other symbol functionality.

To facilitate encoding of greater amounts of information into a single machine-readable symbol, two-dimensional bar codes have been devised. These are also commonly referred to as stacked, matrix and/or area bar codes. Examples of such two-dimensional symbologies include Data Matrix, Code One, PDF-417, MaxiCode, QR Code, and Aztec Code. 2D matrix symbologies employ arrangements of regular polygon-shaped cells (also called elements or modules) where the center to center distance of adjacent elements is uniform. Typically, the polygon-shaped cells are squares. The specific arrangement of the cells in 2D matrix symbologies represents data characters and/or symbology functions.

As an example of a 2D matrix symbol technology, a Data Matrix code is a two-dimensional matrix barcode consisting of high-contrast "cells" (typically black and white cells) or modules arranged in either a square or rectangular pattern. The information to be encoded can be text or numeric data, or control symbols. The usual data size ranges from a few bytes up to 1556 bytes. Specific, designated, standardized groups of cells—typically eight cells—are each referred to as a "symbol character." The symbol characters have values which are referred to as "codewords." With a black cell interpreted as a 0 (zero) and a white cell interpreted as a 1 (one), an eight-cell codeword can code for numbers 0 through 255; in turn, these numeric values can be associated with alphanumeric symbols through standard codes such as ASCII, EBCDIC, or variations thereof, or other functionality.

The codewords—that is, the designated groups of cells in a symbol—have specific, standardized positions within the overall symbol. The interpretation of a symbol in a given context (for example, for a given manufacturer and/or a given product) therefore depends on the codewords within the symbol; and in particular, the interpretation depends on both: (i) the contents of each codeword (that is, the pattern of cells in each codeword), and (ii) the placement or position of each codeword in the symbol.

Typically, for sequential alphanumeric data (for example, a product identification number or a street address), each sequential data character is assigned to the symbols of a codeword in a standardized order. For example, the order may be left-to-right along the rows of the symbol, or according to a standardized diagonal pattern of placement. Because the codewords have specific, standards-specified placements within a symbol—and because no information about the placement is contained in the symbol character—the symbols may also be referred to as "matrix symbols" or "matrix symbology barcodes."

Bar code readers are employed to read the matrix symbols using a variety of optical scanning electronics and methods. Ideally, the machine-readable symbols which are scanned by a bar code reader are in perfect condition, with all of the cells of consistent, uniform size; each cell being fully filled with either total black or total white; and the contrast between black and white cells being 100%.

In real, practical application the machine-readable symbols which are scanned by a bar code reader may be imperfect. They may be smudged by external substances (grease, dirt, or other chemicals in the environment); or the surface on which the symbols were printed may be stretched, compressed, or torn; or the printing process itself may be flawed (for example, due to low ink levels in a printer, clogged printheads, etc.). The defects in actual symbols may introduce errors in the machine reading process.

To address these practical problems, error correction techniques are often used to increase reliability: even if one or more cells are damaged so as to make a codeword unreadable, the unreadable codeword can be recovered through the error-correction process, and the overall message of the symbol can still be read.

For example, machine-readable symbols based on the Data Matrix ECC 200 standard employ Reed-Solomon codes for error and erasure recovery. ECC 200 allows the routine reconstruction of the entire encoded data string when the symbol has sustained 25% damage (assuming the matrix can still be accurately located).

Under this standard, approximately half the codewords in a symbol are used directly for the data to be represented, and approximately half the codewords are used for error correction. The error-correction (EC) symbols are calculated using a mathematical tool known as the Reed-Solomon algorithm. The codewords for the symbol are the input to the Reed-Solomon algorithm, and the error-correction (EC) symbols are the output of the Reed-Solomon algorithm. The complete machine-readable symbol includes both the data codewords and the EC codewords.

For a given symbol format (such as Data Matrix, PDF-417, QR-Code, Aztec Code, and others), and for a given size of the symbol matrix, there are a fixed, designated numbers of EC codewords. To recover any one, particular damaged (unreadable) codeword, two things must be recovered: (i) the location of the damaged data codeword within the symbol, and (ii) the contents (the bit pattern) of the damaged data codeword. In turn, to recover both the location and the bit pattern for a single codeword requires two of the available EC symbols. It follows that if a machine-readable symbol has two damaged codewords, four EC codewords are required to recover the full symbol. Generally, if a symbol has "N" damaged codewords, then 2*N EC codewords are required to recover the full symbol.

The number of EC codewords in a symbol is limited. This places a limit on the number of damaged, unreadable data codewords which can be recovered. Generally, with error correction techniques, and using present methods, the number of damaged data codewords which can be recovered is half the total number of EC codewords. For example, in a Data Matrix symbol with 16×16 cells, the total number of EC codewords is 12. This means that at most 6 damaged data codewords can be recovered. If more than 6 of the data codewords are damaged, the complete symbol may be unreadable.

However, if the location of the data codeword in error is already known, then only one EC codeword is needed to correct the error. This technique is called "erasure decoding". Unfortunately, in Matrix Code symbols generally, the location of the errors is not known.

Therefore, there exists a need for a system and method for recovering more damaged data codewords in a symbol than may be recovered based on only the error-correcting symbols by themselves. More particularly, what is needed is a system and method for determining the location of a damaged or erroneous data codeword, independent of the information stored in the EC codewords.

SUMMARY

Accordingly, in one aspect, the present invention solves the problem of not being able to use erasure decoding with matrix symbologies by evaluating the gray-level information available in the scanner and keeping track of those codewords with the least contrast difference. The decoder then utilizes erasure decoding on these least-contrast codewords. Since the location of the erroneous data codewords has been estimated via the contrast detection, only one EC codeword is required to recover the data in the damaged codeword. (And so, only one EC codeword is required to fully recover the damaged data codeword, both its location and data.)

Because only one EC codeword is required instead of two, more EC codewords remain unused and available for decoding other possible errors. This increases the total number of data codewords that can be corrected. This is particularly useful in applications where symbols get dirty (e.g. automotive assembly), damaged (e.g. supply chain), have specular components (e.g. direct part marking (DPM)) and need to be scanned over a greater range (e.g. all applications).

The algorithm of the present invention has the effect of nearly doubling the number of codewords that can be corrected in matrix symbology decodes, thereby greatly improving the performance over what is currently available.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIG. 7 presents an exemplary array of codeword contrast values used for enhanced error correction by applying contrast analysis to a flawed codeword.

DETAILED DESCRIPTION

In the following description, certain specific details are set forth in order to provide a thorough understanding of various embodiments. However, one skilled in the art will understand that the invention may be practiced without these details. In other instances, well-known structures associated with imagers, scanners, and/or other devices operable to read machine-readable symbols have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the claimed invention.

Symbol Reader

The present system and method embrace devices designed to read machine-readable symbols.

Figure 1:
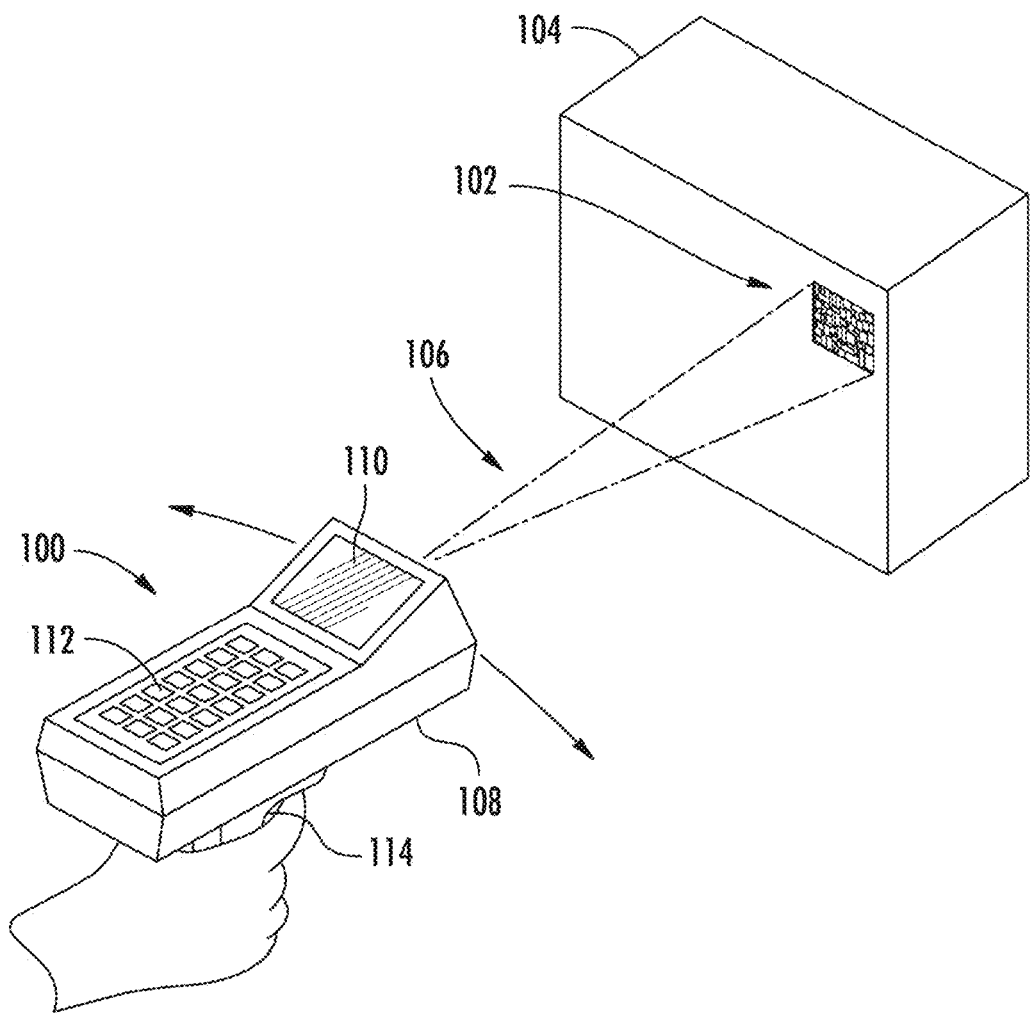
FIG. 1 is a perspective view of an exemplary hand-held symbol reader acquiring data from a machine-readable symbol.

In an exemplary embodiment, such a device may be a hand-held scanner. FIG. 1 is a perspective view of an exemplary hand-held symbol reader 100 acquiring data from a machine-readable symbol 102.

The machine-readable symbol 102 is affixed to a package 104 or the like such that the user points the hand-held symbol reader 100 towards the machine-readable symbol

102. The symbol reader 100 may be a line scanner operable to emit and sweep a narrow beam of electromagnetic energy across a field-of-view 106 over two-dimensional (2D) machine-readable symbol 102. In other embodiments, an aperture means, mirror, lens or the like is adjusted to sweep across a symbol line to receive returning electromagnetic energy from a relatively small portion (e.g., cell) of the machine-readable symbol, which is detected by an optical detector system.

In yet other embodiments, a 2D array symbol reader acquires a captured image of the machine-readable symbol (and a suitable region of quiet area around the machine-readable symbol). For the present system and method, which relies upon a contrast analysis of the cells within the symbol 102, the acquisition of a captured image of the symbol may be a preferred method of operation for the symbol reader 100. Suitable image processing hardware 235 and software running on processors 242, 244 are used to deconstruct the capture image to determine the data bits represented by the cells, and to perform the contrast analysis of the present system and method (see FIG. 2 below).

The machine-readable symbol reader 100 is illustrated as having a housing 108, a display 110, a keypad 112, and an actuator device 114. Actuator device 114 may be a trigger, button, or other suitable actuator operable by the user to initiate the symbol reading process.

The machine-readable symbol 102 shown in the figure is intended to be generic and, thus, is illustrative of the various types and formats of machine-readable symbols. For example, some machine-readable symbols may consist of a single row of codewords (e.g., barcode). Other types of machine-readable symbols (e.g., matrix or area code) may be configured in other shapes, such as circles, hexagons, rectangles, squares and the like. It is intended that many various types and formats of machine-readable symbologies be included within the scope of the present system and method.

Symbol Reader Internal Block Diagram

Figure 2:
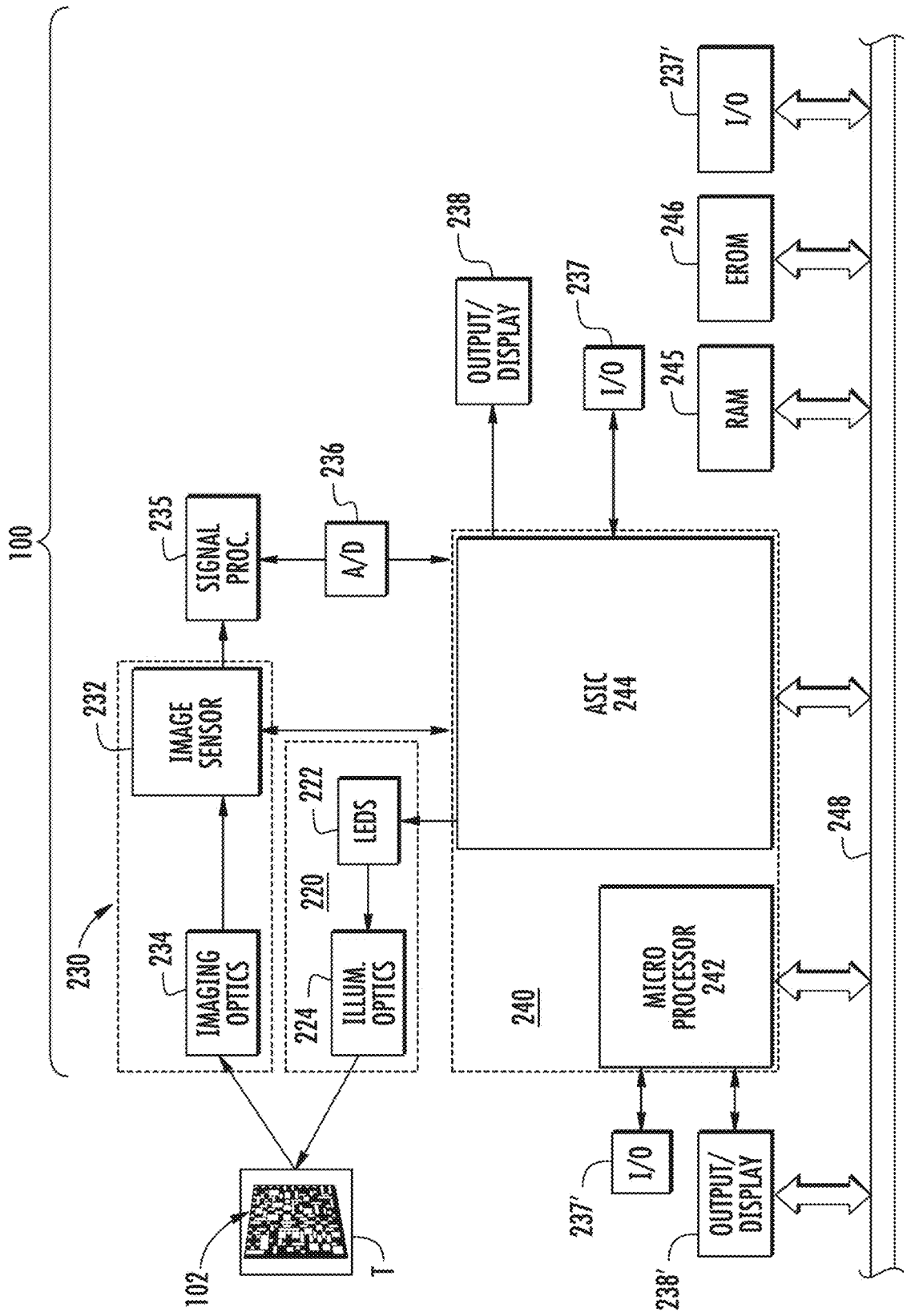
FIG. 2 is an internal block diagram of an exemplary symbol reader for acquiring data from a machine-readable symbol

An internal block diagram of an exemplary symbol reader 100 of a type which may implement the present system and method is shown in FIG. 2.

In one embodiment of the present system and method, the symbol reader 100 may be an optical reader. Optical reader 100 may include an illumination assembly 220 for illuminating a target object T, such as a 1D or 2D bar code symbol 102, and an imaging assembly 230 for receiving an image of object T and generating an electrical output signal indicative of the data which is optically encoded therein. Illumination assembly 220 may, for example, include an illumination source assembly 222, such as one or more LEDs, together with an illuminating optics assembly 224, such as one or more reflectors, for directing light from light source 222 in the direction of target object T. Illumination assembly 220 may be eliminated if ambient light levels are certain to be high enough to allow high quality images of object T to be taken.

In an embodiment, imaging assembly 230 may include an image sensor 232, such as a 2D CCD or CMOS solid state image sensor, together with an imaging optics assembly 234 for receiving and focusing an image of object T onto image sensor 32. The array-based imaging assembly shown in FIG. 2 may be replaced by a laser scanning based imaging assembly comprising a laser source, a scanning mechanism, emit and receive optics, a photodetector and accompanying signal processing circuitry. The field of view of the imaging assembly 230 will depend on the application. In general, the field of view should be large enough so that the imaging assembly can capture a bit map representation of a scene including an image data reading region at close reading range.

In an embodiment of the present system and method, exemplary symbol reader 100 of FIG. 2 also includes programmable controller 240 which may comprise an integrated circuit microprocessor 242 and an application specific integrated circuit (ASIC) 244. Processor 242 and ASIC 244 are both programmable control devices which are able to receive, output and process data in accordance with a stored program stored in either or both of a read/write random access memory (RAM) 245 and an erasable read only memory (EROM) 246. Processor 242 and ASIC 244 are also both connected to a common bus 248 through which program data and working data, including address data, may be received and transmitted in either direction to any circuitry that is also connected thereto. Processor 242 and ASIC 244 may differ from one another, however, in how they are made and how they are used.

In one embodiment, processor 242 may be a general purpose, off-the-shelf VLSI integrated circuit microprocessor which has overall control of the circuitry of FIG. 2, but which devotes most of its time to decoding image data stored in RAM 245 in accordance with program data stored in EROM 246. Processor 244, on the other hand, may be a special purpose VLSI integrated circuit, such as a programmable logic or gate array, which is programmed to devote its time to functions other than decoding image data, and thereby relieve processor 242 from the burden of performing these functions.

In an alternative embodiment, special purpose processor 244 may be eliminated entirely if general purpose processor 242 is fast enough and powerful enough to perform all of the functions contemplated by the present system and method. It will, therefore, be understood that neither the number of processors used, nor the division of labor there between, is of any fundamental significance for purposes of the present system and method.

In an embodiment, exemplary symbol reader 100 includes a signal processor 235 and an analog-to-digital (A/D) chip 236. These chips together take the raw data from image sensor 232 and convert the data to digital format, which in an exemplary embodiment may be a gray-level digital format, for further processing by programmable controller 240.

In an embodiment, the system and method of the present invention employs algorithms stored in EROM 246 which enable the programmable controller 240 to analyze the image data from signal processor 235 and A/D 236. In an embodiment, and as described further below, this image analysis may include analyzing gray-level information (contrast levels) in the image data. In an embodiment, and in part based on the contrast level analysis, programmable controller 240 may then implement an improved system and method of error correction for matrix symbols by relying on optical contrast-level analysis, as also described further below.

Exemplary symbol reader 100 may also include input/output (I/O) circuitry 237, for example to support the use of the keyboard 112 and trigger 114. Symbol reader 100 may also include output/display circuitry 238 to support display 110.

Figure 3:
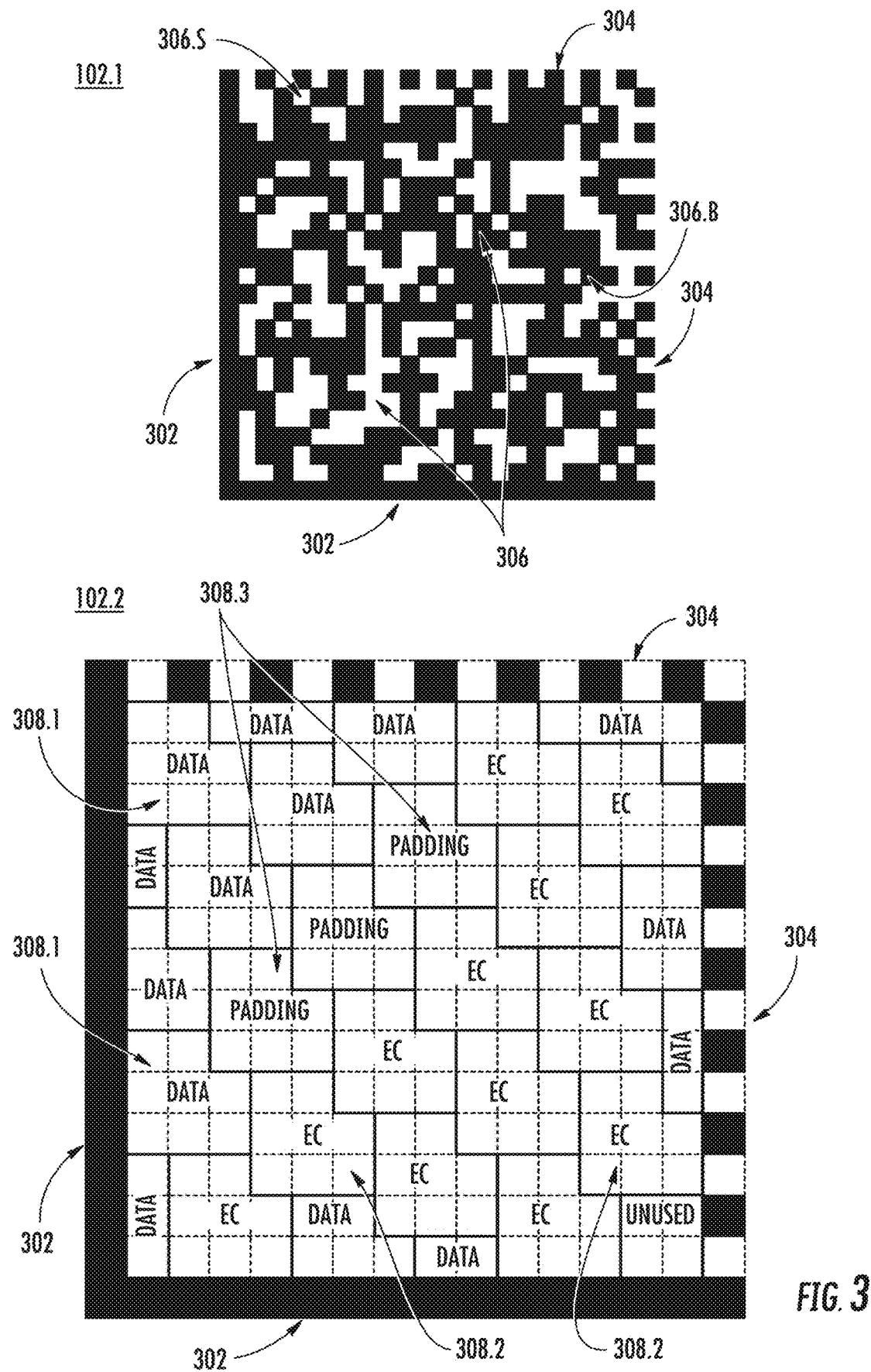
FIG. 3 illustrates several exemplary machine-readable 2D symbols.

FIG. 3 illustrates several exemplary machine-readable 2D symbols 102 labeled 102.1 and 102.2.

Symbol 102.1 is an exemplary machine-readable symbol encoded according to the Data Matrix barcode (ECC 200) standard. The symbol 102.1, which is a 24×24 array, has two solid black borders 302 forming an "L-shape" which are the finder pattern, enabling the symbol reader to determine the location and orientation of the 2D symbol. The symbol also has two opposing borders of alternating dark and light cells which form a "timing pattern" 304 which help the symbol reader identify the size (the number of rows and columns) of the symbol.

Interior to the finder pattern 302 and timing pattern 304 are rows and columns of interior cells 306 which encode information. As may be evident from the figure, an ideal machine-readable symbol has a very high contrast level between the first color dark cells and the second color light cells, in many cases achieved by employing clearly printed, unobscured cells which are either all black or all white.

Symbol 102.2 is an exemplary 16×16 machine-readable symbol encoded according to the Data Matrix barcode (ECC 200) standard. In symbol 102.2, and for purposes of illustration only, the interior black data cells are omitted, and boundaries between the interior cells 306 are suggested by shaded, dotted lines which are not normally present in actual printed data matrix symbols.

Also, not normally present in actual printed symbols, but included here for purposes of illustration, are solid borders which indicate the boundaries of the codewords 308 formed by the interior cells 306. In an embodiment, each codeword 308 is composed of eight cells representing a single byte of data. It will be seen that there are several types of codewords, including data codewords 308.1 which encode the actual data to be represented by the symbol; error-correcting (EC) codewords 308.2 which are generated from the data codewords according to the Reed-Solomon algorithm; and padding codewords 308.3.

The figure also identifies one exemplary bar (black) cell 306.B and one exemplary space (white) cell 306.S.

The illustration here of machine-readable symbols based on the Data Matrix barcode standard, as well as the size, shape, and data contents illustrated, are exemplary only and should not be construed as limiting. The present system and method are applicable to a wide variety of 2D matrix barcodes according to a variety of known standards, as well as being applicable to other 2D machine-readable symbols which may be envisioned in the future.

Symbol Errors

As discussed above, the data content of symbols 102 is stored or presented in the form of cells 306 of contrasting colors within codewords 308. In an embodiment of the present system and method, the light cells (typically white) represent ones (1's) and the dark cells (typically black) represent zeros (0's). In an alternative embodiment, a light cell represents zero (0) and the dark cells represent (1). In alternative embodiments, other colors or levels of shading may be employed. As a general matter, however, for the coding to be effective the symbol reader 100 must be readily able to distinguish the dark cells from the light cells. Also, the data is stored not only in terms of the cells 306 per se, but also in terms of the positions of the cells 306 within the codewords 308, and the positions of each codeword 308 within the symbol 102.

If a symbol 102 is damaged, there may be insufficient contrast between light cells and dark cells for the symbol reader 100 to reliable distinguish the cells. Similarly, damage to the symbol may render it difficult for the symbol reader to identify the location or boundaries of cells 306 and codewords 308. In other cases, damage to cells 306 can cause a change from black to white or vice-versa. This in turn calls upon the error-correction methods, such as Reed-Solomon, already discussed above. The present system and method are intended to augment Reed-Solomon and similar error-correction methods with information based on contrast analysis.

Figure 4:
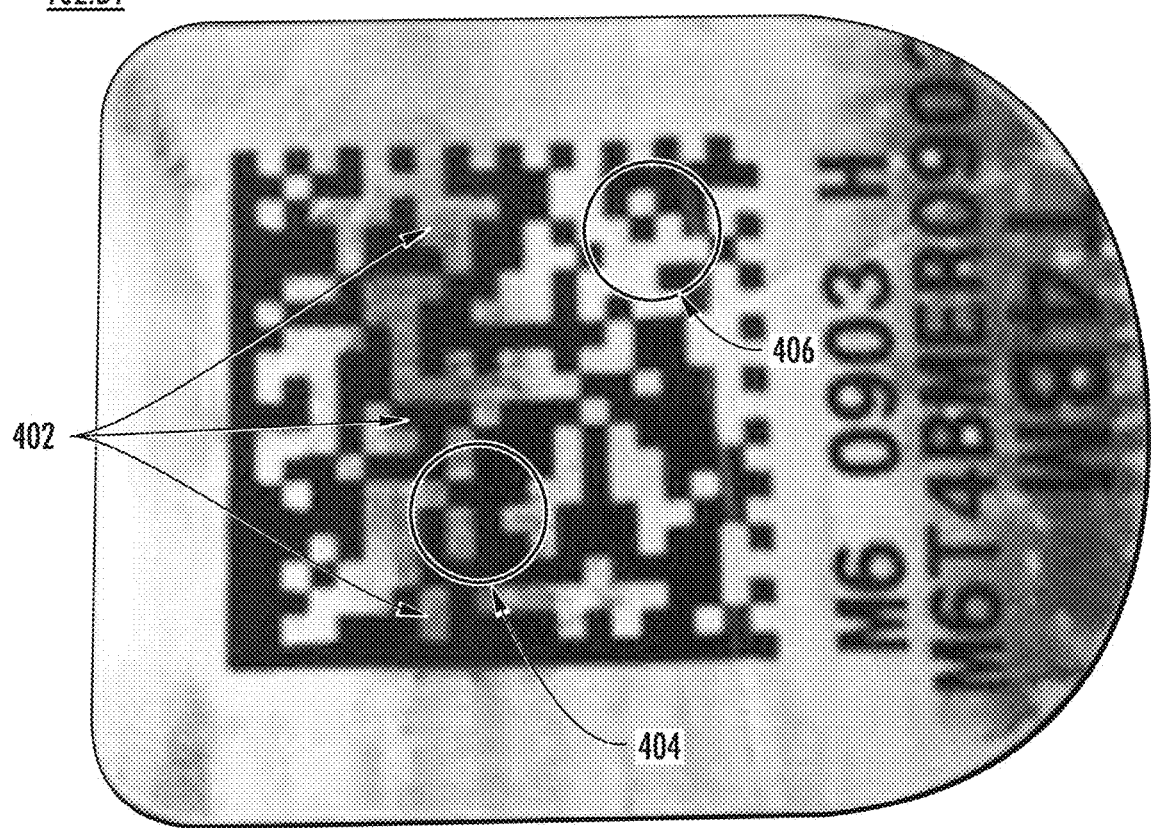
FIG. 4 provides two views of an exemplary 2D symbol which is damaged.
Figure 4:
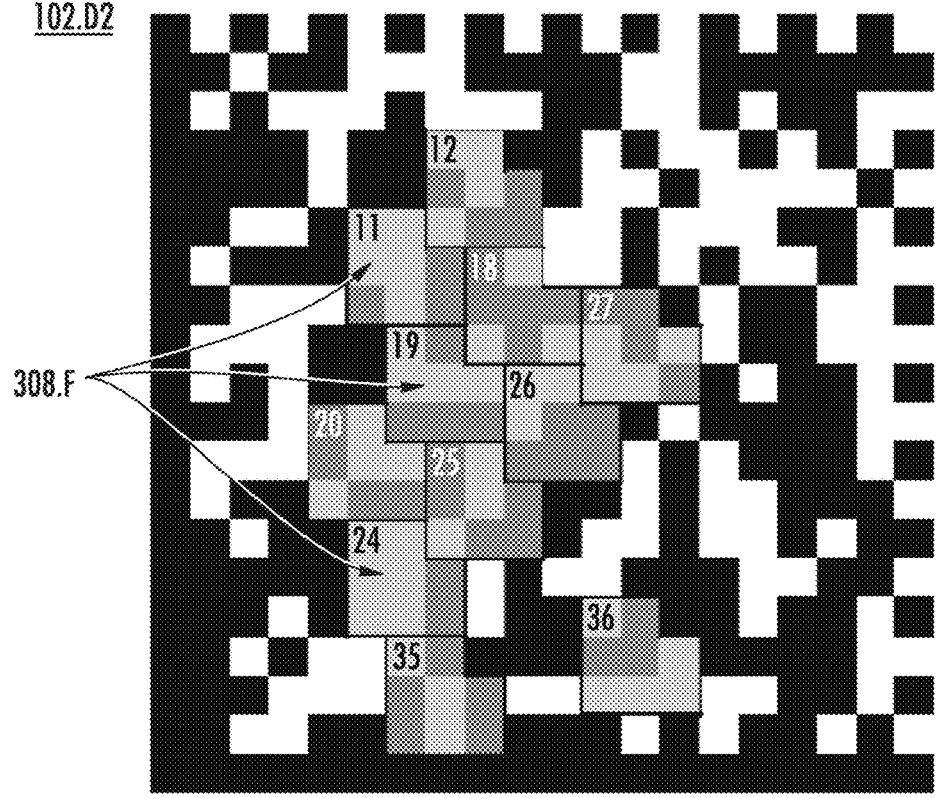

FIG. 4 provides two views 102.D1, 102.D2 of an exemplary symbol which is damaged, so that the original high-contrast has been lost while the symbol 102 is in use in the field.

In the first view, the damaged symbol 102.D1 shown in the figure was photographed in a real-world automotive manufacturing plant. It is apparent that there is a dark vertical scuff mark 402 which is approximately down the middle of the symbol 102.D1. The scuffing is sufficiently dark that, when read with a standard symbol reader 100, the reader 100 mistakes many individual cells 306 for black when (as printed, and without damage or scuffing) they are white cells. This in turns causes codeword errors. This symbol 102.D1 will not read with current scanners.

The actual value of the codewords in symbol 102.D1 is listed here (codewords before the colon are data codewords, those after the colon are error-correction codewords):

237 151 230 204 27 207 144 165 112 27 13 43 222 60 125 34 137 186 71 163 223 254:96 9 171 31 209 21 131 100 111 146 225 95 109 112 182 218 118 203

The values for the codewords determined by a symbol reader 100 are shown here, with the incorrect codewords underlined:

237 151 230 204 27 207 144 165 112 27 <u>173</u> <u>111</u> 222 60 125 34 137 <u>191</u> <u>127</u> <u>235</u> 223 254 :96 <u>25</u> <u>175</u> <u>191</u> <u>208</u> 21 131 100 111 146 225 95 <u>111</u> <u>116</u> 182 218 118 203

As is apparent in the image of symbol 102.D1, throughout the smudged region 402 the contrast between many individual cells is small, and is close to the threshold level between black and white. Compare for example a cluster of low contrast cells 404 within the smudged region 402 with a non-damaged, machine-readable high contrast region 406.

In the second view, the damaged symbol 102.D2 is illustrated as it was interpreted by an actual scanner 100 in the field. As shown by the codewords with shaded cells 306 in the illustration, there were eleven codewords 308 which provided flawed readings from the scanner 100, and may be described as flawed codewords 308.F.

Erasure vs. Error: By way of terminology, it is noted here that if the position of an erroneous codeword is known, but the data is not known (or is ambiguous), the codeword is referred to as an "erasure." If the data of an erroneous codeword is unknown and the position of the codeword is also unknown, the codeword is referred to as an "error."

Reed-Solomon Error Correction

In an embodiment, the present system and method includes application of error-correcting codes and analyses, augmented with optical analysis of a machine-readable symbol 102, to detect and correct errors in the machine-readable symbol 102. Various mathematical methods of error correction are well-known in the art, and a detailed description is beyond the scope of this document. However, review of a few basic elements of an exemplary error-correction method may aid in the understanding of the present system and method.

All standardized 2D matrix symbologies utilize the Reed-Solomon methodology. In Reed-Solomon codes, a set of data elements, such as bytes of data, may be redundantly encoded in a second set of error-correcting elements (also typically in byte form), which for present purposes can be referred to as EC codewords 308.2. The error-correcting codewords are transmitted or presented along with the principle data elements, enabling reconstruction of damaged data elements.

Methods of constructing the Reed-Solomon EC codewords (based on a given, particular data set) are outside the scope of this document. It suffices for present purposes to understand that Reed-Solomon-derived EC codewords 308.2 can be calculated, and the resulting EC codewords are included as part of 2D matrix symbols, as already described above.

There are a variety of methods of decoding a message with Reed-Solomon error correction. In one exemplary method, the values of the data codewords 308.1 of a symbol 102 are viewed as the coefficients of a polynomial s(x) that is subject to certain constraints (not discussed here):

$$S(x) = \sum_{i=0}^{n-1} c_i x^i$$

It will be noted that not only the values of the data codewords 308.1 matter, but also their order. The ordinal placement of the codewords ($1^{st}$, $2^{nd}$, $3^{rd}$, etc.) in the polynomial maps to the physical ordering of the data codewords 308.1 in the machine-readable symbol 102.

If the machine-readable symbol 102 is damaged or corrupted, this may result in data codewords 308.1 which are incorrect. The erroneous data can be understood as a received polynomial r(x):

$$e(x) = \sum_{i=0}^{n-1} e_i x^i$$

where $e_i$ is the coefficient for the $i^{th}$ power of x. Coefficient $e_i$ will be zero if there is no error at that power of x (and so no error for the corresponding $i^{th}$ data codeword 308.1 in the symbol 102); while the coefficient $e_i$ will be nonzero if there is an error. If there are υ errors at distinct powers $i_k$ of x, then:

$$e(x) = \sum_{k=1}^{N} (e\_i_k)(x^{\wedge} i_k)$$

The goal of the decoder is to find the number of errors (υ), the positions of the errors ($i_k$), and the error values at those positions ($e\_i_k$). From those, e(x) can be calculated, and then e(x) can be subtracted from the received r(x) to get the original message s(x).

There are various algorithms which can be employed, as part of the Reed-Solomon scheme, to identify the error positions ($i_k$) and the error values at those positions ($e\_i_k$), based solely on the received data codewords 308.1 and the received EC codewords 308.2. The processes involved, however, are generally a two-stage processes, where:

Stage (I) Error Locations: The first calculation stage entails identifying the location of the errors. This entails first calculating an error-locator polynomial Λ, and based on Λ, calculating the non-zero error positions $i_k$. This stage also determines the number of errors (υ). This first stage calculation inevitably requires the use of some of the EC codewords 308.2 in the symbol 102.

Stage (II) Corrected Values: Employing the location errors $i_k$ as calculated in stage (i), the second calculation stage identifies the correct values ($e\_i_k$) associated with each error location.

It will be seen then that in the prior art, correcting errors is a two-stage process, where identifying error locations generally precedes, and is an input to, identifying the corrected data at each location. It is a goal of the present system and method to either reduce or possibly eliminate the calculations of stage (I), by using analyses apart from Reed-Solomon error correction to determine identify or mark the erroneous data codewords 308.1.

Persons skilled in the art will recognize that the non-zero error positions $i_k$ calculated via the alternative methods (discussed further below) can be input directly into stage (II), thereby enabling the calculations of the correct data values in stage (II).

Importantly, in the mathematics of standard Reed-Solomon error correction, errors (both location and data unknown) requires the use of two error correcting code words to repair a damaged codeword. If, on the other hand, knowledge of the location of the error exists, then the error is considered an erasure, and only one error correction codeword is required to repair the erased codeword.

Stated another way: Normally, error-correction in 2D matrix symbologies is used to correct codewords which are errors, meaning that both the location and contents of the codeword are unknown. The goal of the present system and method is to independently flag errors so that they are instead treated as erasures, for which the location is known, thereby requiring only one EC codeword for correction.

Optical Clarity and Optical Ambiguity, Decoding Disadvantage, and Reed-Solomon Error Correction As discussed above, Reed-Solomon error correction requires the use of two EC codewords 308.2 to correctly recover both the location and the data contents of a single data codeword 308.1 which is flawed. However, the present system and method aims to enable the identification (at least provisionally) of the locations of the flawed or damaged codewords 308.F—and to make such identification independently of the EC codewords 308.2 in the symbol 102. Such alternative means of locating the data codewords 308.1 which are flawed supplements the data in the EC codewords 308.2; as a result, only a single EC codeword 308.2 is required to identify the data in a data codeword 308.1 Flawed codewords 308.F may also be referred to as codewords which have a "decoding disadvantage."

To identify the locations of the codewords with a decoding disadvantage, independent of the error-correcting information within the symbol 102 itself, the present system and method identifies those codewords 308 in the symbol 102 which have a low level of optical clarity, or equivalently, a high level of optical ambiguity. By "optical clarity" is meant any codeword 308 which, as presented to the reader 100, is sufficiently clear and distinct (e.g., has high optical contrast) to be read very reliably by the symbol reader's optical system 230, 235. If a codeword 308 is not optically clear—for example, due to poor printing, smudging or marking in the field, ripping or tearing, or other causes—then the codeword is deemed optically ambiguous; there is a significant probability that the data for an optically ambiguous codeword, as determined by a reader 100, will not match the intended data of the same codeword.

Figure 5:
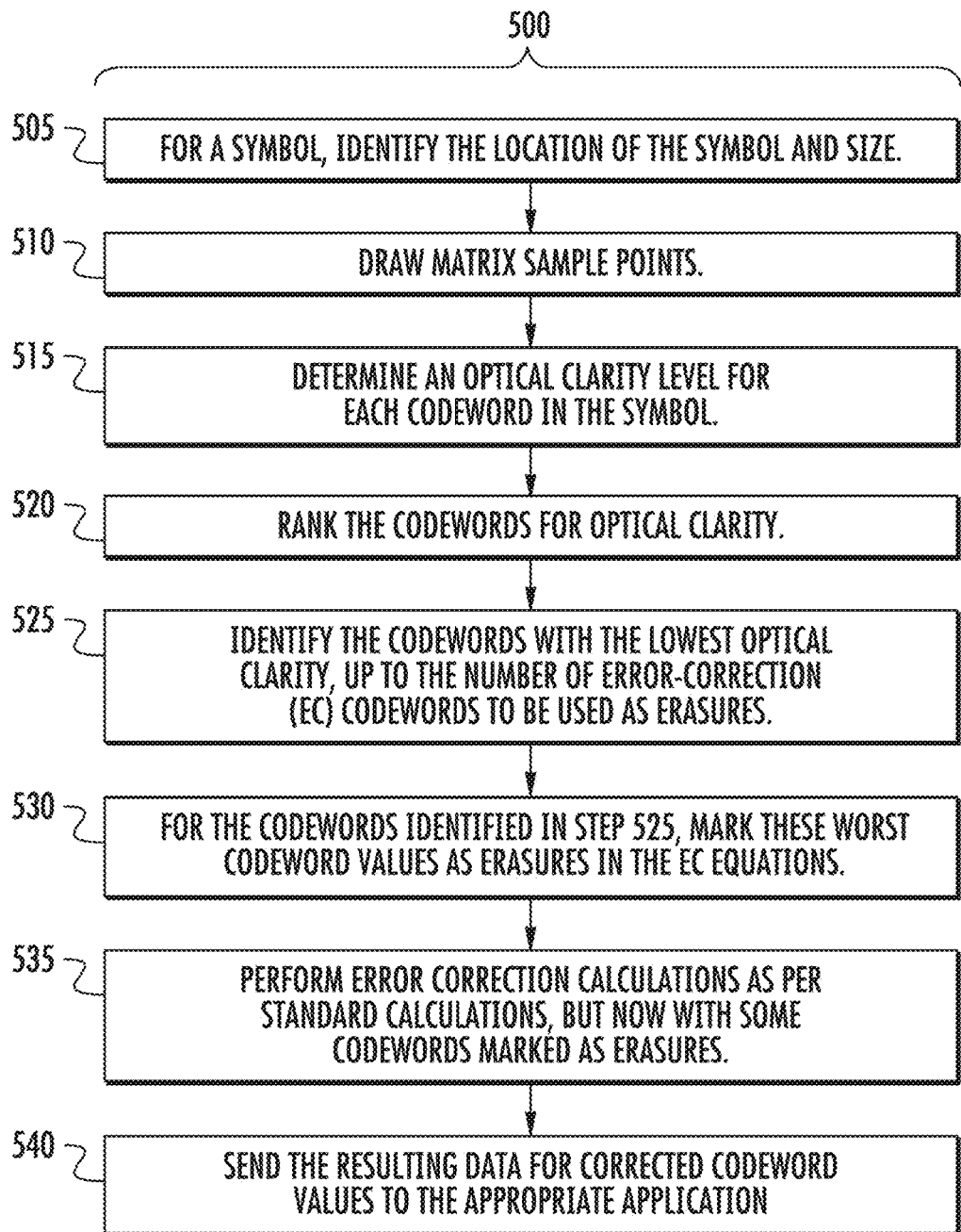
FIG. 5 is a flow-chart of an exemplary method for optically enhanced Reed-Solomon error-correction for a 2D symbol.

FIG. 5 presents a flow-chart of an exemplary method 500 for optically enhanced Reed-Solomon error-correction for a symbol 102. The steps of exemplary method 500 are generally performed via the processor(s) 240, memory 245, and other components of the symbol reader 100.

In step 505, the symbol reader 100 identifies the location of the symbol 102 and the appropriate parameters such as the size. For example, for a DataMatrix symbol, the reader 100 finds the "L-shape" 302 and finds the clock track 304 to identify the number of rows and columns in the symbol. The L-shape 302 and clock track 304 help the reader 100 determine the symbol's tilt and orientation, and provide reference points from which to decode the matrix of data cells.

In step 510, the symbol reader 100 creates a matrix or array of sample points (pixels), indicating the reflectances (bright or dark) of points within the symbol 102. These sample points are used to determine reflectance of cells 306 within the symbol. A single cell 306 may have multiple sample points measured, and together these may be used (for example, averaged) to determine the reflectance of each cell 306.

As discussed above, the symbol 102 is composed of codewords 308 with standardized positions, that is, which are made up of standardized clusters of cells 306 with designated positions within the symbol matrix 102.

In step 515, the method 500 determines a level of optical clarity for each codeword 308. A high level of optical clarity, which is desirable, means the codeword's cells are distinctive and that the data value of the codeword can be read with a high probability of accuracy.

A low level of optical clarity—or equivalently, a high level of optical ambiguity—may result from physical damage to a symbol, or from dirt or grease marking the symbol, or other causes as discussed above. Low optical clarity, or high optical ambiguity, means that the codeword's cells are not distinctive and the codeword has a decoding disadvantage. The low level of optical clarity therefore means that the data value of the codeword can be ascertained only with a suboptimal degree of reliability.

Optical clarity/ambiguity may be determined in a variety of ways. In one embodiment of the present system and method, discussed in detail below, the optical clarity/ambiguity is determined based on an analysis of the contrast level between cells 306 within each codeword 308. Codewords 306 which exhibit the lowest internal contrast levels may be marked as optically ambiguous.

In an alternative embodiment, optical clarity/ambiguity may be determined based on analysis of the degree to which a codeword 308 is in-focus or not in-focus. In an alternative embodiment, optical clarity/ambiguity may be determined based on analysis of the definition or lack of definition of lines separating the dark cells 306 from light cells 306.

In an alternative embodiment, optical clarity/ambiguity may be determined based on a degree to which the horizontal and vertical lines of the codewords 308 are parallel to, or are not parallel to, the border-L shape. Other methods of assessing optical clarity of a codeword 308 may be envisioned as well, and fall within the scope and spirit of the present system and method.

In step 520, exemplary method 500 ranks the codewords 308 according to optical clarity, for example from highest to lowest in optical clarity. In step 525, method 500 identifies the lowest ranked codewords (those which are most optically ambiguous), up to the number of codewords 308 to be used as erasures.

In steps 530 and 535, the lowest-ranked codewords 308 identified in step 525—that is, the codewords with the highest optical ambiguity—are marked as erasures in the error-correction equations, and the Reed-Solomon error-correction equations are then executed. Steps 530 and 535 thereby reduce or eliminate the calculations discussed above for a phase (I) of the Reed-Solomon error correction process, and thereby also reduce or eliminate the use of EC codewords 308.2 to identify the locations of flawed codewords 308.F.

Gray-Scale Contrast Analysis Algorithm

In one embodiment, the present system and method identifies codewords 308 with high optical ambiguity (low optical clarity) via contrast analysis of the codewords within the symbol 102.

The present system and method employ a "matrix-cell contrast analysis algorithm," "gray-scale contrast analysis algorithm," or simply "contrast analysis algorithm" (CAA) for short. The contrast analysis algorithm of the present system and method determines the actual gray level of each cell 306 in the symbol 102. The CAA also identifies the black/white contrast threshold for the symbol 102. The black/white contrast threshold is the brightness level above which a cell 306 is considered to be white, and below which a cell is considered to be black. The algorithm then determines the difference between the contrast level of each cell 306 and the black/white threshold. If the differential is comparatively low for one or more cells 306 in a particular codeword 308, the codeword 306 may have a decoding disadvantage.

More generally, the CAA may identify a light/dark threshold level, which is a brightness level above which a cell 306 is considered to be of a first, lighter color (for example, white); and below which a cell is considered to be of a second, darker color (for example, black).

A scanner 100 will conventionally store, in memory 245, the "color" of each cell 306, for example, a red-green-blue (RGB) value or a hue-saturation-brightness (HSB) value. The present system and method will also store, in the memory (245) of the scanner 100, an actual, measured gray-scale level for each cell 306.

Figure 6:
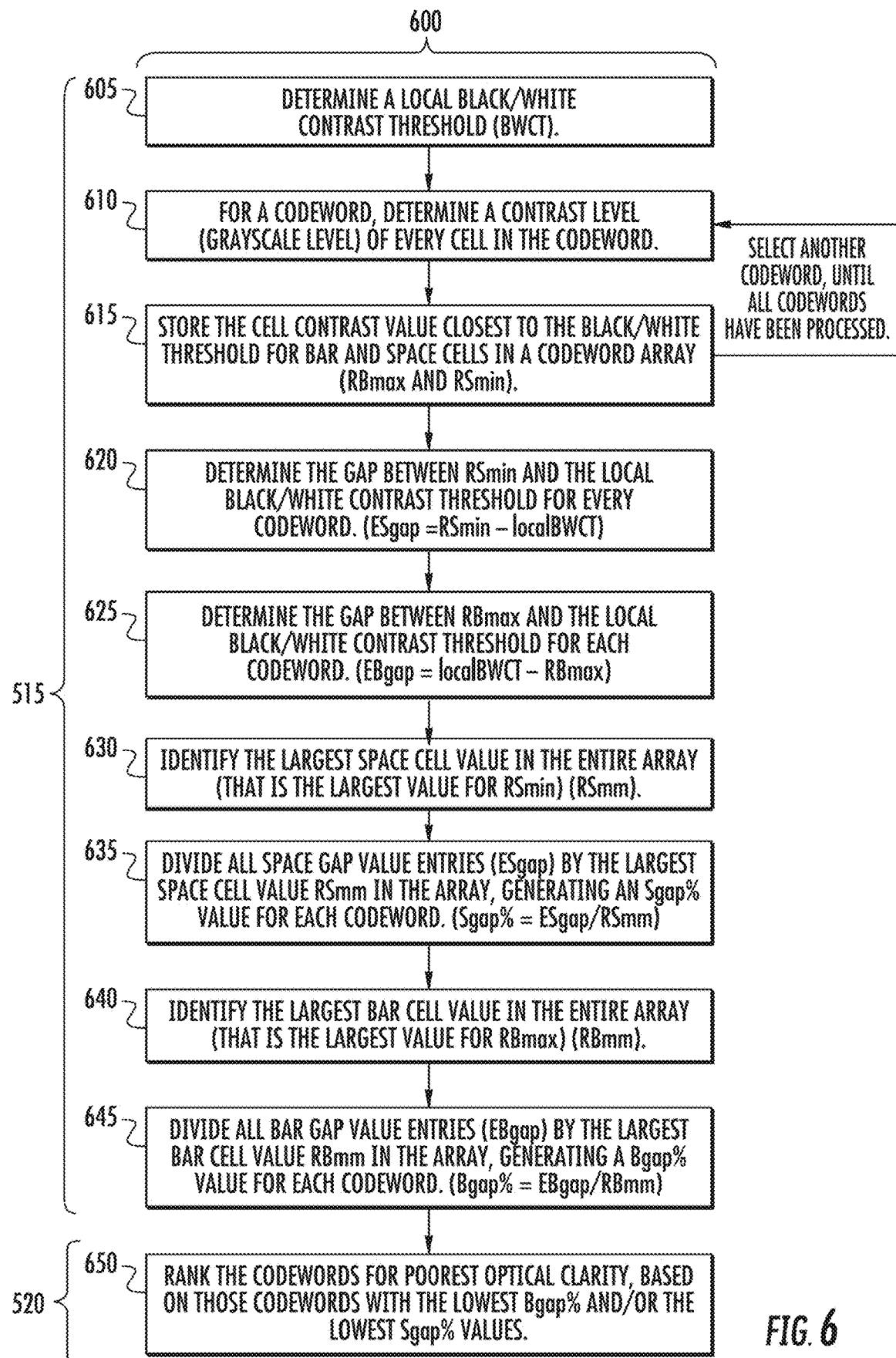
FIG. 6 is a flow-chart of an exemplary method for contrast analysis for a 2D symbol as part of enhanced Reed-Solomon error correction.

FIG. 6 presents a flow-chart of an exemplary method 600 for contrast analysis according to the present system and method. Steps 605 through 645 of exemplary method 600 collectively may be considered to be one exemplary embodiments of step 515 of method 500, already discussed above. (Step 515 determines an optical clarity for each codeword 308 in the symbol 102.) Step 650 of exemplary method 600 may be considered to be one exemplary embodiment of step 520 of method 500, that is, ranking the codewords for optical clarity.

Where exemplary method 500 was directed to generally determining and ranking codewords 308 by optical clarity, the exemplary method 600 particularly employs an exemplary approach to contrast analysis in order to determine and rank optical clarity. The steps of exemplary method 600 are generally performed via the processor(s) 240, memory 245, and other components of the symbol reader 100.

In step 605, the symbol reader 100 determines a local black/white contrast threshold (BWCT). The black/white contrast threshold (BWCT), as described above, is a reflectance level above which a cell 306 is considered white, and below which a cell 306 is considered black. This is typically determined by (i) identifying the reflectance of all the cells 306 in the symbol; (ii) identifying the highest reflectance value and the lowest reflectance value; and (iii) identifying a middle-value, such as the mean or the median, and using the middle-value as the BWCT. The present system and method refine this by employing a local BWCT for each cell 306. In an exemplary embodiment, a local BWCT for a given cell 306 may be determined by considering only those other cells local to the given cell 306, and then identifying the mean or median reflectance among those cells. In an embodiment, the number of local cells used to determine the local BWCT may be twenty (20). In an alternative embodiment the number of local cells used to determine the BWCT for a given cell may be higher or lower than twenty (20).

In step 610, the method 600 selects a particular codeword 308, (as specified in the appropriate standards for the size and shape of the symbol 102), and identifies the contrast level (the grayscale level) of each cell in the codeword.

In step 615, the method 600 determines, for the particular codeword at hand, a bar cell (306.B) with a contrast value closest to the BWCT; and a space cell (306.S) with a contrast value closest to the BWCT; and then stores these two cell contrast values in a codeword contrast values array in memory (see FIG. 7 below for an example). The contrast values may be labeled as RSmin for the space cell (306.S) closest to the BWCT, and RBmax for the bar cell (306.B) closest to the BWCT. An equivalent phrasing: RSmin is the smallest space cell reflectance (darkest), and RBmax is the largest bar cell reflectance (lightest).

Steps 610 and 615 are repeated for all codewords 308 in the symbol 102. This results in a listing of RSmin and RBmax for each codeword 308 in the symbol.

In step 620, the method 600 determines the erasure gap for spaces between RSmin and the local black/white contrast threshold for each codeword. (ESgap=RSmin−localBWCT)

In step 625, the method 600 determines the erasure gap for bars between RBmax and the local black/white contrast threshold for each codeword. (EBgap=localBWCT−RBmax)

In step 630, the method 600 identifies the largest space cell value in the entire array, that is the largest value for RSmin. This value, which may be labeled as RSmm, is used for normalization in the following step.

In step 635, the method 600 divides all space gap value entries (ESgap) by the largest space cell ("white cell") value in the array, RSmm, generating an Sgap % value for each codeword. (Sgap %=ESgap/RSmm)

In step 640, the method 600 identifies the largest bar cell ("black cell") value in the entire array, that is the largest value for RBmin. This value, which may be labeled as RBmm, is used for normalization in the following step.

In step 645, the method 600 divides all bar gap value entries (EBgap) by the largest bar cell value in the array, RBmm, generating a Bgap % value for each codeword. (Bgap %=EBgap/RBmm)

Sgap % and Bgap %, then, are the percentage relative closeness of the deviant cell to the black/white contrast threshold. These percentage values, Sgap % and Bgap %, may also be referred to as the minimum interior contrast levels 702 for each cell 306. The minimum interior contrast levels 702 are a measure of the optical clarity of the codewords 308 in the symbol 102. Specifically: Those codewords 308 with the lowest values for Sgap % and/or the lowest values for Bgap % have the highest optical ambiguity (and therefore the least or worst optical clarity).

As noted above, the preceding steps 605 through 645 of method 600 may collectively be considered to be one exemplary embodiment of step 515 of method 500, already discussed above, that is, determining an optical clarity for each codeword 308 in the symbol 102.

In step 650, and based on the Sgap % and Bgap % values determined in steps 635 and 645, the method 600 ranks the lowest gap percent values up to the number of error correction codewords to be used as erasures. Step 650 of exemplary method 600 may be considered to be one exemplary embodiment of step 520 of method 500, that is, ranking the codewords for optical clarity/ambiguity.

These lowest ranked, least clear codewords are the codewords with the lowest optical clarity (or highest ambiguity), which are then used as erasures in the Reed-Solomon equations (step 530 of method 500).

Sample Applications

FIG. 7 presents an exemplary codeword contrast values array 700 of the kind which may be constructed according to exemplary method 600, above. The array contains actual codeword measurements for the symbol image 102.D1/102.D2 of FIG. 4, above. In array 700, CW is the codeword number; and, as per discussion above:

▶ RSmin is the smallest (darkest) space cell reflectance for each codeword 308;

▶ RBmax is the largest (lightest) bar cell reflectance for each codeword 308;

▶ ESgap is the erasure space gap calculated as RSmin minus the threshold (75hex in this case);

▶ EBgap is the threshold minus RBmax for the bar cells;

▶ Sgap % and Bgap % are the relative closeness of the deviant cell to the black/white threshold in percent, also referred to as the minimum interior contrast levels 702; and ▶ Rank is a listing of the worst 12 codewords (those with the smallest gap percentage) in the symbol 102.

Figure 8:
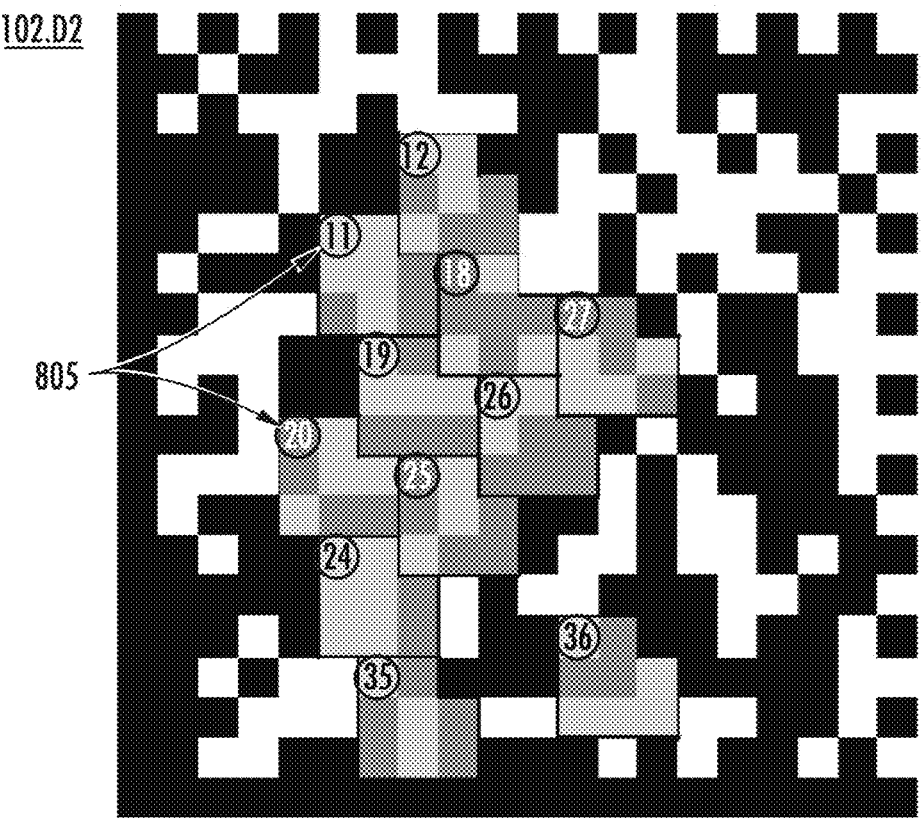
FIG. 8 illustrates an exemplary case-study of enhanced error correction by applying contrast analysis to a flawed codeword.
Figure 8:
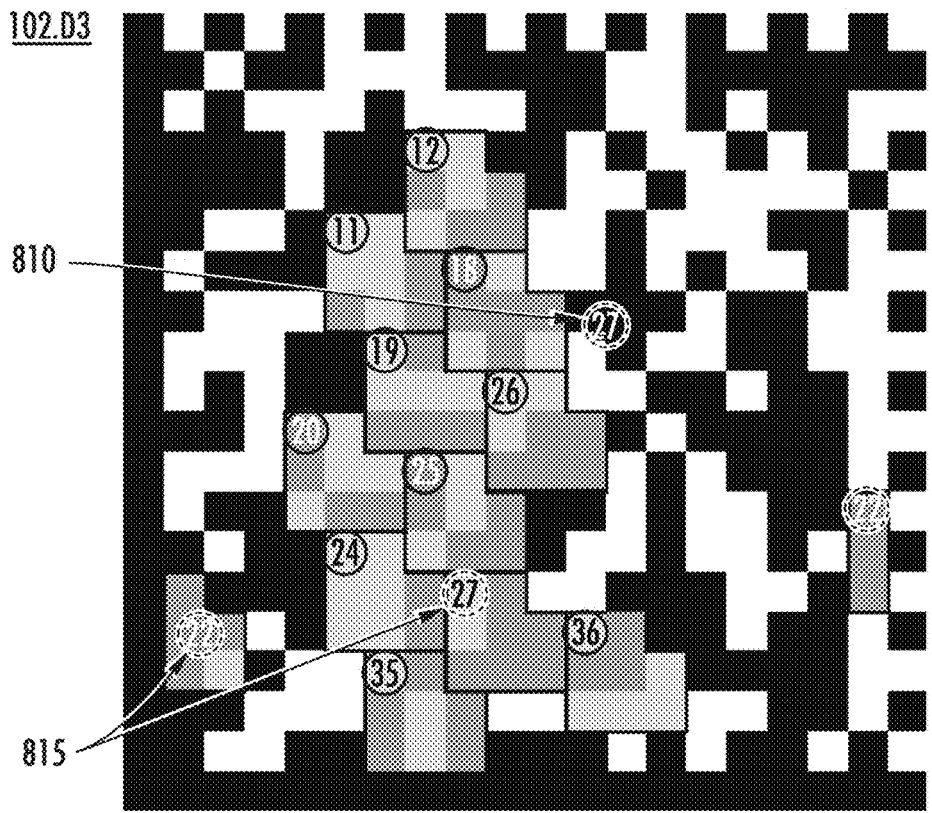

FIG. 8 illustrates an exemplary case-analysis demonstrating how poor cell contrast can identify a majority of flawed codewords 308.F. The damaged symbols shown in the figure are the same as the damaged symbol pictured and illustrated in FIG. 4, above. In FIG. 8, numbered codeword locations 805 are identified (by a standardized number scheme) for those codewords which are flowed or damaged.

102.D2, reproduced here from FIG. 4 for convenience, is the damaged symbol as it was interpreted by an actual scanner 100 in the field.

Symbol 102.D3 is the same symbol as it was interpreted according the exemplary contrast analysis algorithms discussed above in conjunction with FIG. 5 and FIG. 6.

As can be seen in FIG. 8, there are two codewords 815 which were assessed as being in error by the present system and method, but which were actually read correctly by the scanner 100. Of the latter codewords, one was in the damaged region 402 (codeword 27) and another was a codeword where there is a scratch through the dark cell, making it lighter (codeword 22).

As can also be seen from FIG. 8, there is one codeword 810 which was actually read in error by the scanner 100, but was not flagged by the gray-scale contrast analysis algorithm of the present system and method.

All the remaining, identified codewords 308 (a total of ten) which were flagged as being in error based on contrast analysis are codewords which were, in fact, read in error by the scanner 100.

The codeword that the analysis missed (codeword 27) is easily decoded using the 6 error correction codewords still remaining. This is an example of a symbol that was far from being decodable using standard decoding methods, yet using a gray-scale contrast analysis algorithm, the symbol can sustain this and slightly more damage and still be decodable.

Further Applications

The example shown (in FIGS. 4 and 8) clearly benefits from the gray-scale contrast analysis decoding since the damage to the symbol 102.D1/102.D2 is contrast based. However, the present system and method will also work with other types of damage such as matrix distortion, uniform dark or light damage and for DPM cell variation. When these types of distortion are present, there will be many sample points that rest on cell boundaries which will be recorded as reduced contrast values. As long as the matrix distortion (such as wrinkling) is localized or the dark/light damage is less than approximately one-third of the symbol, the present system and method will substantially improve decoding rates on all types of problem symbols 102.D.

Summary

Improved matrix symbology decode performance is possible when there is some knowledge of potentially damaged codewords 308. One means of achieving improved decode performance is by measuring the gray-level contrast variation of every codeword, and marking those with contrast values that are closest to the black/white threshold as erasures. Using gray-level information and using erasure correction in matrix symbologies will allow successful decoding far into a damage region where current product decoding fails.

To supplement the present disclosure, this application incorporates entirely by reference the following patents, patent application publications, and patent applications:

U.S. Pat. Nos. 6,832,725; 7,128,266; 7,159,783; 7,413,127; 7,726,575; 8,294,969; 8,317,105; 8,322,622; 8,366,005; 8,371,507; 8,376,233; 8,381,979; 8,390,909; 8,408,464; 8,408,468; 8,408,469; 8,424,768; 8,448,863; 8,457,013; 8,459,557; 8,469,272; 8,474,712; 8,479,992; 8,490,877; 8,517,271; 8,523,076; 8,528,818; 8,544,737; 8,548,242; 8,548,420; 8,550,335; 8,550,354; 8,550,357; 8,556,174; 8,556,176; 8,556,177; 8,559,767; 8,599,957; 8,561,895; 8,561,903; 8,561,905; 8,565,107; 8,571,307; 8,579,200; 8,583,924; 8,584,945; 8,587,595; 8,587,697; 8,588,869; 8,590,789; 8,596,539; 8,596,542; 8,596,543; 8,599,271; 8,599,957; 8,600,158; 8,600,167; 8,602,309; 8,608,053; 8,608,071; 8,611,309; 8,615,487; 8,616,454; 8,621,123; 8,622,303; 8,628,013; 8,628,015; 8,628,016; 8,629,926; 8,630,491; 8,635,309; 8,636,200; 8,636,212; 8,636,215; 8,636,224; 8,638,806; 8,640,958; 8,640,960; 8,643,717; 8,646,692; 8,646,694; 8,657,200; 8,659,397; 8,668,149; 8,678,285; 8,678,286; 8,682,077; 8,687,282; 8,692,927; 8,695,880; 8,698,949; 8,717,494; 8,717,494; 8,720,783; 8,723,804; 8,723,904; 8,727,223; D702,237; 8,740,082; 8,740,085; 8,746,563; 8,750,445; 8,752,766; 8,756,059; 8,757,495; 8,760,563; 8,763,909; 8,777,108; 8,777,109; 8,779,898; 8,781,520; 8,783,573; 8,789,757; 8,789,758; 8,789,759; 8,794,520; 8,794,522; 8,794,525; 8,794,526; 8,798,367; 8,807,431; 8,807,432; 8,820,630; 8,822,848; 8,824,692; 8,824,696; 8,842,849; 8,844,822; 8,844,823; 8,849,019; 8,851,383; 8,854,633; 8,866,963; 8,868,421; 8,868,519; 8,868,802; 8,868,803; 8,870,074; 8,879,639; 8,880,426; 8,881,983; 8,881,987; 8,903,172; 8,908,995; 8,910,870; 8,910,875; 8,914,290; 8,914,788; 8,915,439; 8,915,444; 8,916,789; 8,918,250; 8,918,564; 8,925,818; 8,939,374; 8,942,480; 8,944,313; 8,944,327; 8,944,332; 8,950,678; 8,967,468; 8,971,346; 8,976,030; 8,976,368; 8,978,981; 8,978,983; 8,978,984; 8,985,456; 8,985,457; 8,985,459; 8,985,461; 8,988,578; 8,988,590; 8,991,704; 8,996,194; 8,996,384; 9,002,641; 9,007,368; 9,010,641; 9,015,513; 9,016,576; 9,022,288; 9,030,964; 9,033,240; 9,033,242; 9,036,054; 9,037,344; 9,038,911; 9,038,915; 9,047,098; 9,047,359; 9,047,420; 9,047,525; 9,047,531; 9,053,055; 9,053,378; 9,053,380; 9,058,526; 9,064,165; 9,064,167; 9,064,168; 9,064,254; 9,066,032; 9,070,032;

U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;

International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;

U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);

U.S. patent application Ser. No. 14/150,393 for Indicia-reader Having Unitary Construction Scanner, filed Jan. 8, 2014 (Colavito et al.);

U.S. patent application Ser. No. 14/200,405 for Indicia Reader for Size-Limited Applications filed Mar. 7, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 29/486,759 for an Imaging Terminal, filed Apr. 2, 2014 (Oberpriller et al.);

U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/277,337 for MULTIPURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/334,934 for a SYSTEM AND METHOD FOR INDICIA VERIFICATION, filed Jul. 18, 2014 (Hejl);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/483,056 for VARIABLE DEPTH OF FIELD BARCODE SCANNER filed Sep. 10, 2014 (McCloskey et al.);

U.S. patent application Ser. No. 14/513,808 for IDENTIFYING INVENTORY ITEMS IN A STORAGE FACILITY filed Oct. 14, 2014 (Singel et al.);

U.S. patent application Ser. No. 14/519,195 for HAND-HELD DIMENSIONING SYSTEM WITH FEEDBACK filed Oct. 21, 2014 (Laffargue et al.);

U.S. patent application Ser. No. 14/519,179 for DIMENSIONING SYSTEM WITH MULTIPATH INTERFERENCE MITIGATION filed Oct. 21, 2014 (Thuries et al.);

U.S. patent application Ser. No. 14/519,211 for SYSTEM AND METHOD FOR DIMENSIONING filed Oct. 21, 2014 (Ackley et al.);

U.S. patent application Ser. No. 14/519,233 for HAND-HELD DIMENSIONER WITH DATA-QUALITY INDICATION filed Oct. 21, 2014 (Laffargue et al.);

U.S. patent application Ser. No. 14/519,249 for HAND-HELD DIMENSIONING SYSTEM WITH MEASUREMENT-CONFORMANCE FEEDBACK filed Oct. 21, 2014 (Ackley et al.);

U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGUMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing detailed description has set forth various embodiments of the devices and/or processes via the use of block diagrams, flow charts, schematics, exemplary data structures, and examples. Insofar as such block diagrams, flow charts, schematics, exemplary data structures, and examples contain one or more functions and/or operations, it will be understood by those skilled in the art that each function and/or operation within such block diagrams, flowcharts, schematics, exemplary data structures, or examples can be implemented, individually and/or collectively, by a wide range of hardware, software, firmware, or virtually any combination thereof.

In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the control mechanisms taught herein are capable of being distributed as a program product in a variety of tangible forms, and that an illustrative embodiment applies equally regardless of the particular type of tangible instruction bearing media used to actually carry out the distribution. Examples of tangible instruction bearing media include, but are not limited to, the following: recordable type media such as floppy disks, hard disk drives, CD ROMs, digital tape, flash drives, and computer memory.

The various embodiments described above can be combined to provide further embodiments. These and other changes can be made to the present systems and methods in light of the above-detailed description. In general, in the following claims, the terms used should not be construed to limit the invention to the specific embodiments disclosed in the specification and the claims, but should be construed to include all machine-readable symbol scanning and processing systems and methods that read in accordance with the claims. Accordingly, the invention is not limited by the disclosure, but instead its scope is to be determined entirely by the following claims.

What is claimed is:

1. A method of error correction of a two-dimensional (2D) symbol, the method comprising:

accessing, by a processor, a plurality of codewords in the 2D symbol;

determining, by the processor, a contrast threshold associated with each codeword of the plurality of codewords;

determining, by the processor, a minimum interior contrast level for each codeword of the plurality of codewords, wherein determining the minimum interior contrast level comprises:

determining, within a codeword of the plurality of codewords, a space cell having a smallest space cell reflectance value and a bar cell having a largest bar cell reflectance value; and determining an erasure gap for bars and an erasure gap for spaces, wherein the erasure gap for bars is determined based on the largest bar cell reflectance value and the contrast threshold, and wherein the erasure gap for spaces is determined based on the smallest space cell reflectance value and the contrast threshold;

identifying, by the processor, an optically ambiguous codeword of the plurality of codewords in the 2D symbol, wherein the optically ambiguous codeword corresponds to a codeword having a lowest minimum interior contrast level amongst the minimum interior contrast levels for each codeword of the plurality of codewords; and correcting, by the processor, errors in the optically ambiguous codeword based on a location of the optically ambiguous codeword and an erroneous decoded value associated with the optically ambiguous codeword.

2. The method of claim 1, wherein each of the plurality of codewords is associated with a number that is indicative of a location of a codeword within the 2D symbol, and wherein the location of the optically ambiguous codeword is determined based on the number associated with the optically ambiguous codeword.

3. The method of claim 1, wherein the space cell having the smallest space cell reflectance value corresponds to a space cell with a contrast value closest to the contrast threshold.

4. The method of claim 1, wherein the bar cell having the largest bar cell reflectance value corresponds to a bar cell with a contrast value closest to the contrast threshold.

5. The method of claim 1, wherein determining the contrast threshold associated with each codeword of the plurality of codewords comprises:
   identifying a reflectance value of the plurality of cells in a codeword;
   identifying a highest reflectance value and a lowest reflectance value amongst the reflectance value associated with each of the plurality of cells; and
   determining a mean of the highest reflectance value and the lowest reflectance value to determine the contrast threshold.

6. The method of claim 1, wherein the location of the optically ambiguous codeword is determined independent of error correction codewords included in the 2D symbol.

7. The method of claim 1, wherein the errors in the optically ambiguous codeword are corrected using an error correcting codeword.

8. An electronic device for performing error correction of a two dimensional (2D) symbol, the electronic device comprising:
   an optical scanner configured to optically read, by an optical scanner of a symbol reader, a plurality of codewords in the 2D symbol; and
   a processor configured to:
      determine a contrast threshold associated with each codeword of the plurality of codewords;
      determine a minimum interior contrast level for each codeword of the plurality of codewords, wherein to determine the minimum interior contrast level, the processor is configured to:
         determine, within a codeword of the plurality of codewords, a space cell having a smallest space cell reflectance value and a bar cell having a largest bar cell reflectance value; and
         determine an erasure gap for bars and an erasure gap for spaces, wherein the erasure gap for bars is determined based on the largest bar cell reflectance value and the contrast threshold, and wherein the erasure gap for spaces is determined based on the smallest space cell reflectance value and the contrast threshold;
      identify an optically ambiguous codeword of the plurality of codewords in the 2D symbol, wherein the optically ambiguous codeword corresponds to a codeword having a lowest minimum interior contrast level; and
      correct errors in the optically ambiguous codeword based on a location of the optically ambiguous codeword and an erroneous decoded value associated with the optically ambiguous codeword.

9. The electronic device of claim 8, wherein each of the plurality of codewords is associated with a number that is indicative of a location of a codeword within the 2D symbol, and wherein the location of the optically ambiguous codeword is determined based on the number associated with the optically ambiguous codeword.

10. The electronic device of claim 8, wherein the space cell having the smallest space cell reflectance value corresponds to a space cell with a contrast value closest to the contrast threshold.

11. The electronic device of claim 8, wherein the bar cell having the largest bar cell reflectance value corresponds to a bar cell with a contrast value closest to the contrast threshold.

12. The electronic device of claim 8, wherein to determine the contrast threshold associated with each of the codeword, the processor is further configured to:
   identify a reflectance value of the plurality of cells in a codeword;
   identify a highest reflectance value and a lowest reflectance value amongst the reflectance value associated with each of the plurality of cells; and
   determine a mean of the highest reflectance value and the lowest reflectance value to determine the contrast threshold.

13. The electronic device of claim 8, wherein the location of the optically ambiguous codeword is determined independent of error correction codewords included in the 2D symbol.

14. The electronic device of claim 8, wherein the errors in the optically ambiguous codeword are corrected by utilizing an error correcting codeword.

15. A computer readable, non-transitory storage medium storing instructions that, when executed by a processor of a symbol reader, causes the processor to execute a method of error correction for a two-dimensional (2D) symbol, the method comprises:
   optically reading, by an optical scanner of a symbol reader, a plurality of codewords in the 2D symbol;
   determining, by the processor, a contrast threshold associated with each codeword of the plurality of codewords;
   determining, by the processor, a minimum interior contrast level for each codeword of the plurality of codewords, wherein determining the minimum interior contrast level comprises:
      determining, within a codeword of the plurality of codewords, a space cell having a smallest space cell reflectance value and a bar cell having a largest bar cell reflectance value; and determining an erasure gap for bars and an erasure gap for spaces to determine the minimum interior contrast level;

identifying, by the processor, an optically ambiguous codeword of the plurality of codewords in the 2D symbol, wherein the optically ambiguous codeword corresponds to a codeword having a lowest minimum interior contrast level; and correcting, by the processor, errors in the optically ambiguous codeword based on a location of the optically ambiguous codeword.

16. The computer readable, non-transitory storage medium of claim 15, wherein each of the plurality of codewords is associated with a number that is indicative of a location of a codeword within the 2D symbol, and wherein the location of the optically ambiguous codeword is determined based on the number associated with the optically ambiguous codeword.

17. The computer readable, non-transitory storage medium of claim 15, wherein the space cell having the smallest space cell reflectance value corresponds to a space cell with a contrast value closest to the contrast threshold.

18. The computer readable, non-transitory storage medium of claim 15, wherein the bar cell having the largest bar cell reflectance value corresponds to a bar cell with a contrast value closest to the contrast threshold.

19. The computer readable, non-transitory storage medium of claim 15, wherein determining the contrast threshold associated with each codeword of the plurality of codewords comprises:

identifying a reflectance value of the plurality of cells in a codeword;

identifying a highest reflectance value and a lowest reflectance value amongst the reflectance value associated with each of the plurality of cells; and determining a mean of the highest reflectance value and the lowest reflectance value to determine the contrast threshold.

20. The computer readable, non-transitory storage medium of claim 15, wherein the location of the optically ambiguous codeword is determined independent of error correction codewords included in the 2D symbol.

* * * * *